June 20, 1939.　　D. J. CAMPBELL　　2,163,022

METHOD OF PRODUCING VEHICLE WHEELS

Filed Dec. 14, 1937　　3 Sheets-Sheet 1

Inventor
DONALD J. CAMPBELL

By Charles W. Dake
Attorney

June 20, 1939.  D. J. CAMPBELL  2,163,022
METHOD OF PRODUCING VEHICLE WHEELS
Filed Dec. 14, 1937   3 Sheets-Sheet 2
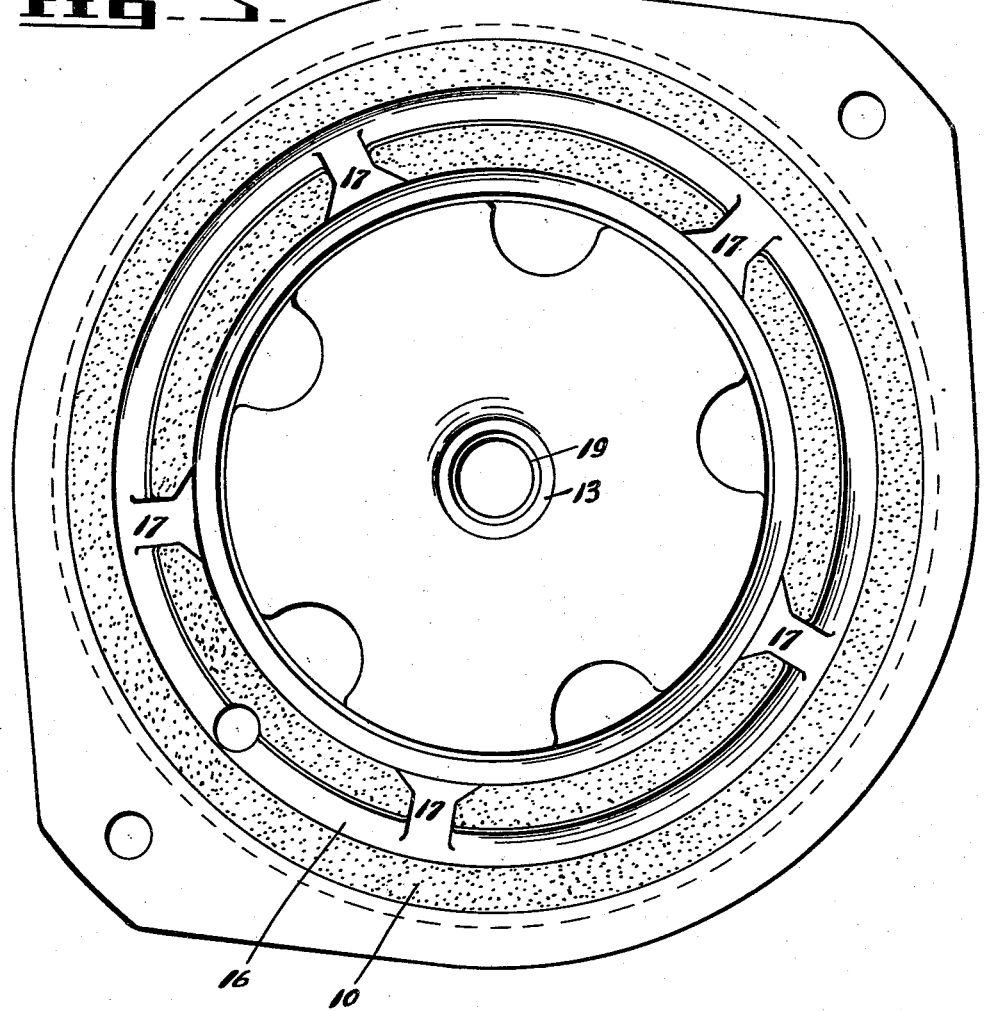
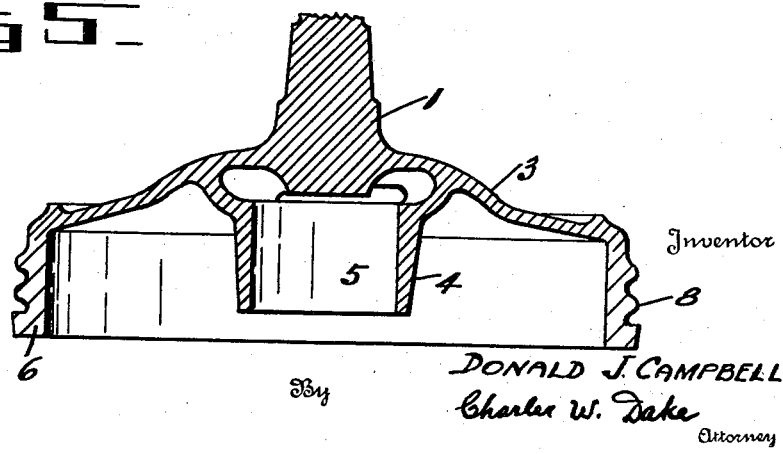
Inventor
DONALD J. CAMPBELL
By Charles W. Dake
Attorney June 20, 1939.  D. J. CAMPBELL  2,163,022
METHOD OF PRODUCING VEHICLE WHEELS
Filed Dec. 14, 1937   3 Sheets-Sheet 3

Inventor
DONALD J. CAMPBELL

By Charles W. Dake
Attorney

Patented June 20, 1939

2,163,022

UNITED STATES PATENT OFFICE 2,163,022

METHOD OF PRODUCING VEHICLE WHEELS

Donald J. Campbell, Spring Lake Township, Ottawa County, Mich., assignor to Campbell, Wyant & Cannon Foundry Company, Muskegon Heights, Mich., a corporation of Michigan Application December 14, 1937, Serial No. 179,658

1 Claim. (Cl. 22—205)

My present invention relates to a method of producing motor vehicle wheel structures and particularly wheel structures for automobiles in which the hub and web thereof are of cast steel and the braking band is of cast iron. The invention has for its objects, first, to produce such vehicle wheel structures cheaply; second, to produce composite wheel structures having the hub and web thereof of cast steel and the braking band member of cast iron by one casting operation in one and the same mold; third, to produce a wheel structure having a hub and web of cast steel and a brake drum member of cast iron integral with each other; and, fourth, to produce a wheel structure in which the portion subjected to the most stresses will be of steel and the braking drum braking surface will be of cast iron.

While I have enumerated certain objects of my present invention, other objects will appear from a perusal of the present description when taken in connection with the accompanying drawings, in which:

Figure 3 is a plan view of the drag portion of the mold shown in Fig. 2.

Fig. 5 is a cross-sectional view of a vehicle wheel structure casting as produced by my method of producing composite metal vehicle wheels.

Throughout the drawings, similar numerals refer to similar parts or portions, and referring thereto:

Figure 1:
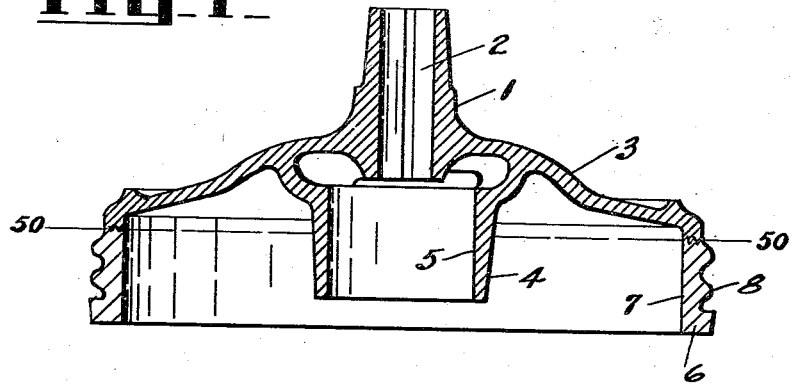
Figure 1 is a cross-sectional view of a finished composite metal vehicle wheel made in accordance with my method of producing composite metal vehicle wheels.
Figure 2:
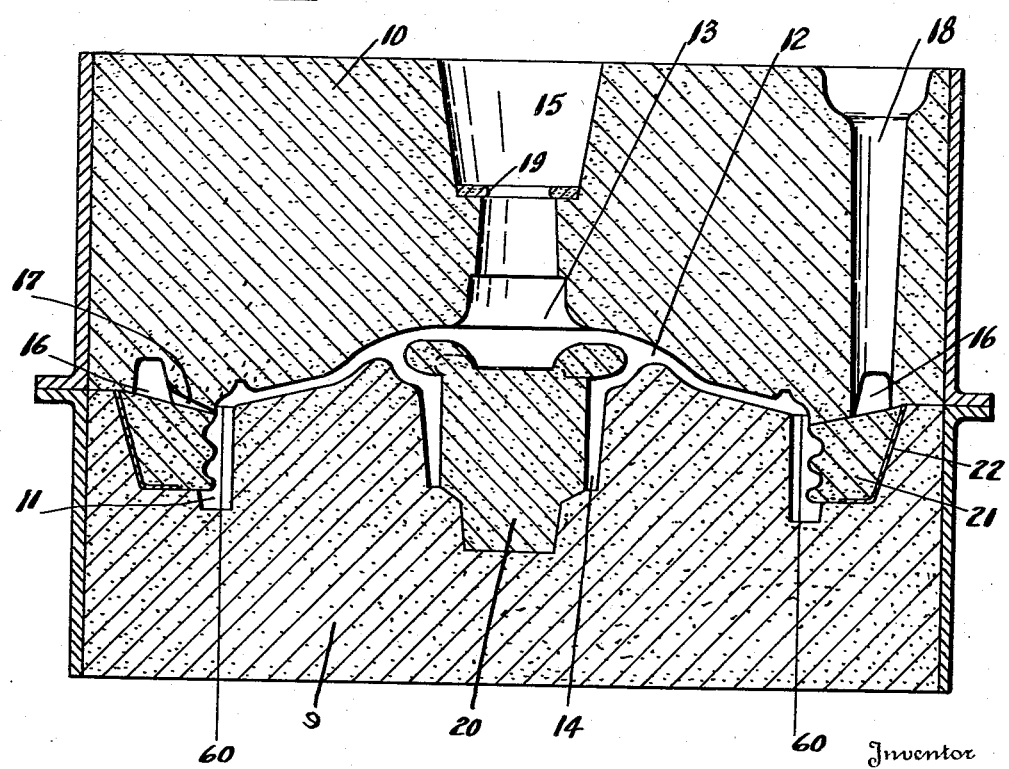
Figure 2 is a sectional view of a mold in which to cast my composite steel and iron wheel structure.
Figure 4:
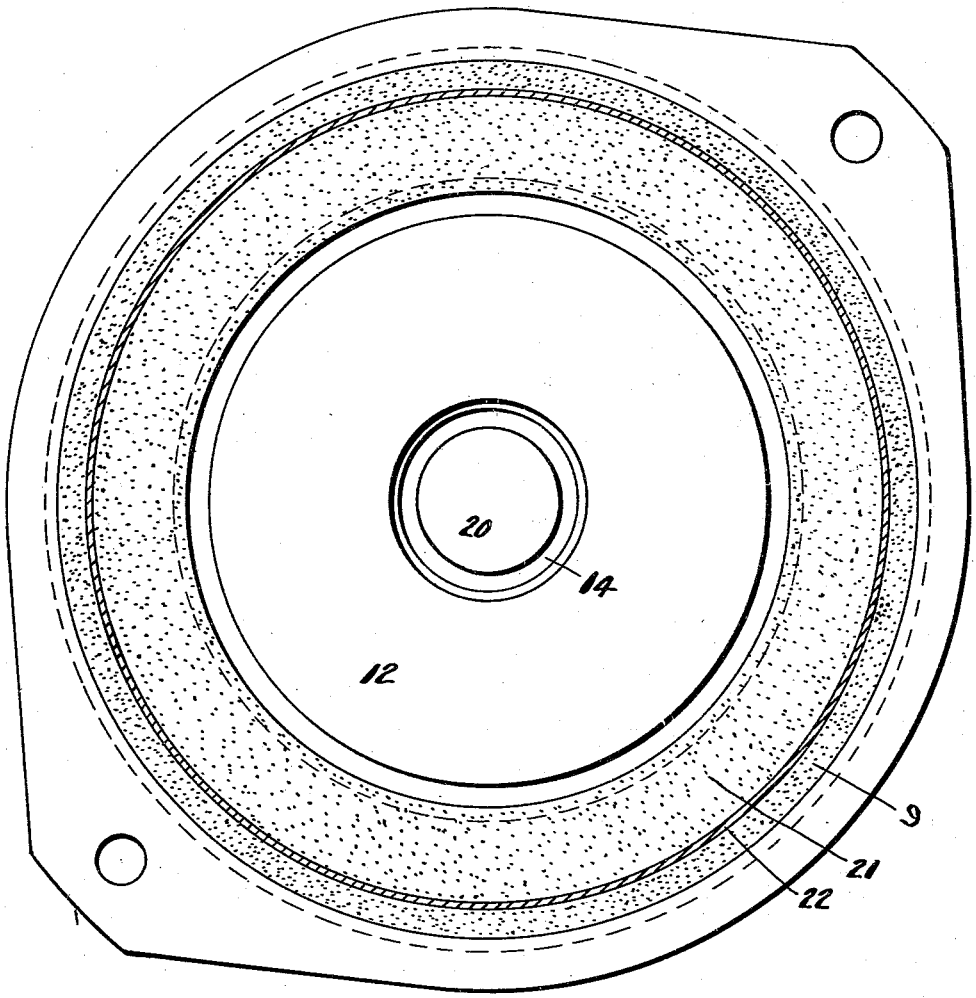
Figure 4 is a view of the cope portion of the mold shown in Fig. 2 as seen when looking upward from line 60—60 of Fig. 2.

Numeral 1 refers to the wheel hub having bore 2 extending axially therethrough with wheel web 3 extending generally radially therefrom having extending sleeve boss 4 in which is bearing receiving bore 5, cast iron braking band member 6 joined as at line 50—50, as by a molecular inter-knitting of the steel of the wheel web and the iron of the braking band, having braking surface 7 and annular heat transfer ribs 8 at its outer periphery.

Referring now to the mold by which I carry out my invention, numeral 9 refers to the drag portion and 10 to the cope portion of a sand mold having a single cavity comprising a braking band casting portion 11, in which is cast the iron braking band portion 6, web casting portion 12, hub casting portion 13, boss 4 casting portion 14, feeder cavity portion 15, annular runner portion 16, connected to the cavity portion 11 by runner gates 17, and feeder sprue 18. Core 19 produces a neck at the end of hub 2, which when cast of lesser diameter than the hub assures that the rupture, when the feeder is broken from the hub, will be close to the hub and will not break into the hub. Core 20 produces the desired form of the interior sleeve boss 4. 21 represents an annular mold member or cheek by which the ribs 8 are formed at the outer periphery of the brake drum. 22 represents a metal container in which the mold member 21 is formed and supported for handling and placing in the mold.

Having provided the mold substantially as described, I provide molten iron having the required constituents such as carbon, silicon and other alloying metals as may be desired, and of such temperature that the iron will be fluid and flow freely, and also fluid, free-flowing molten steel. Having provided the molten iron and steel as above, I pour a quantity of molten iron sufficient to fill the cavity portion 11 up to approximately the line 60—60, which corresponds to line 50—50 of Fig. 1; and when the molten iron within the cavity portion 11 and runner gates 17 has solidified, which requires between fifteen and forty seconds, I then pour through the feeder cavity portion 15 into the mold cavity portions 13, 14 and 12 and onto the solidified iron in the cavity portion 11, the molten steel provided, which as it comes in contact with the solidified iron, remelts the contacting surface thereof and causes an inter-mixing or inter-knitting of the iron and steel molecules, that when cooled, forms my composite cast iron and cast steel vehicle wheel, in which the braking band member is of cast iron, with its desirable braking characteristics and the hub, web and bearing boss are of steel with its required strength, is produced as illustrated in Fig. 5 of the drawings.

I claim:

The method of producing vehicle wheels having a braking band of cast iron and a supporting web for said band including the hub of the wheel of steel, the method including the steps of producing a mold having a single cavity in which to cast said braking band, web and hub, positioning the mold with the portion of the cavity in which to cast the band downward, depositing in the mold cavity sufficient molten iron to form the braking band and thereafter depositing in the mold against the upper end of the braking band sufficient quantity of molten steel to form the supporting web for the braking band and the said hub.

DONALD J. CAMPBELL.